(12) United States Patent
Chen et al.

(10) Patent No.: US 9,262,986 B2
(45) Date of Patent: Feb. 16, 2016

(54) REFERENCE FRAME MANAGEMENT FOR SCREEN CONTENT VIDEO CODING USING HASH OR CHECKSUM FUNCTIONS

(75) Inventors: Sijia Chen, Zhejiang (CN); Sawyer Shan, Anhui (CN); Hui Liu, Anhui (CN); Siping Tao, Anhui (CN)

(73) Assignee: Cisco Technology, Inc., San Jose, CA (US)

( * ) Notice: Subject to any disclaimer, the term of this patent is extended or adjusted under 35 U.S.C. 154(b) by 799 days.

(21) Appl. No.: 13/526,956

(22) Filed: Jun. 19, 2012

(65) Prior Publication Data

US 2013/0148721 A1 Jun. 13, 2013

Related U.S. Application Data

(60) Provisional application No. 61/567,787, filed on Dec. 7, 2011.

(51) Int. Cl.
*H04N 7/32* (2006.01)
*G09G 5/00* (2006.01)
*H04N 19/105* (2014.01)
*H04N 19/14* (2014.01)
*H04N 19/17* (2014.01)

(Continued)

(52) U.S. Cl.
CPC ............. *G09G 5/001* (2013.01); *H04N 19/105* (2014.11); *H04N 19/14* (2014.11); *H04N 19/17* (2014.11); *H04N 19/189* (2014.11); *G09G 2340/02* (2013.01); *G09G 2340/0407* (2013.01); *G09G 2340/0442* (2013.01); *G09G 2360/12* (2013.01); *G09G 2370/10* (2013.01); *H04N 19/58* (2014.11)

(58) Field of Classification Search
CPC ............. G09G 5/001; G09G 2340/02; G09G 2340/0407; G09G 2340/0442; G09G 2360/12; G09G 2370/10; H04N 19/58; H04N 19/105; H04N 19/14; H04N 19/17; H04N 19/189
USPC ............ 375/240.12, 240.01, 240.25; 382/170
See application file for complete search history.

(56) References Cited

U.S. PATENT DOCUMENTS

| 6,417,888 B1 | 7/2002 | Dunn et al. | |
| 8,787,460 B1 * | 7/2014 | Hobbs | H04N 19/00 375/240.16 |

(Continued)

OTHER PUBLICATIONS

CN101527830A Translated Abstract and Full Text. Sep. 2009.*

(Continued)

*Primary Examiner* — Christopher S Kelley
*Assistant Examiner* — Zhihan Zhou
(74) *Attorney, Agent, or Firm* — Edell, Shapiro & Finnan, LLC (57) ABSTRACT

Techniques are provided for reference frame management for screen content video coding using hash or checksum functions. A video data stream including a plurality of frames is received, each frame including a plurality of pixels that define content within the frame. A plurality of hash code values associated with partitioned portions of a current frame are determined, where each hash code value is determined as an output value from a hash or checksum function based upon an input value comprising pixel values for a corresponding partition within the current frame. The current frame is compared with a plurality of reference frames based upon a comparison of the hash code values of the current frame with hash code values of the reference frames. A reference frame is selected as a candidate reference frame for coding the current frame.

9 Claims, 7 Drawing Sheets

(51) Int. Cl.
*H04N 19/189* (2014.01)
*H04N 19/58* (2014.01)

(56) References Cited

U.S. PATENT DOCUMENTS

| | | | |
|---|---|---|---|
| 2007/0116110 A1* | 5/2007 | Diamant et al. | 375/240 |
| 2007/0157070 A1* | 7/2007 | Wenger et al. | 714/807 |
| 2008/0170619 A1 | 7/2008 | Landau | |
| 2009/0262804 A1* | 10/2009 | Pandit et al. | 375/240.12 |
| 2010/0104021 A1* | 4/2010 | Schmit | 375/240.24 |
| 2011/0080959 A1* | 4/2011 | Bjorklund et al. | 375/240.25 |
| 2011/0150269 A1* | 6/2011 | Yoshioka | 382/100 |
| 2012/0033727 A1* | 2/2012 | Shor et al. | 375/240.02 |
| 2012/0087583 A1* | 4/2012 | Yang et al. | 382/170 |
| 2013/0266078 A1* | 10/2013 | Deligiannis et al. | 375/240.25 |

OTHER PUBLICATIONS

Chenping Lu, et al., "An Enhanced Screen Codec for Live Lecture Broadcasting", 978-1-4244-58 5 8—5/10/ IEEE, ICALIP2010, Shanghai Jiaotong University, China, (pp. 108-114).

* cited by examiner

FIG.7

REFERENCE FRAME MANAGEMENT FOR SCREEN CONTENT VIDEO CODING USING HASH OR CHECKSUM FUNCTIONS

CROSS REFERENCE TO RELATED APPLICATIONS

This application claims priority from U.S. Provisional Application No. 61/567,787, entitled "Reference Picture Management For Screen Content Video Coding Using MD5", and filed Dec. 7, 2011, the disclosure of which is incorporated herein by reference in its entirety.

TECHNICAL FIELD

The present disclosure relates to desktop sharing of content and encoding of such shared content prior to transmission, where reference pictures or frames are utilized as needed to enhance video coding performance.

BACKGROUND

Desktop sharing has become an important feature in current collaboration software. It allows virtual meeting attendees to be viewing the same material or content (video, documents, etc.) during a discussion. To make desktop sharing possible, the screen content that is being shared by the sending computing device during a collaboration session must be continuously captured, encoded, transmitted, and finally rendered at receiving computing devices for display.

Desktop sharing applications can compress screen content into H.264 standard video bit streams. The screen content being shared is typically treated as ordinary camera captured video, where frames of the screen content are encoded utilizing intra-frame and/or inter-frame encoding techniques. By finding a suitable match between a current frame and a previous/reference frame, redundancies in encoding of the current frame (or portions of the current frame) can be avoided, since the coding of the reference frame (or portions thereof) can be used as a reference for the current frame, thus minimizing the coding and decoding of content that is required for the sharing of content between two or more computing devices.

However, screen content video has features and characteristics that can be different from camera video, such as the frequent page switching, scrolling back and forth within certain types of content (e.g., text documents), etc. For screen content coding using video compression, enabling multiple reference frames can greatly benefit compression efficiency, because screen content video can be efficiently encoded by inter-frame prediction using a proper reference. However, since the frame resolutions in screen content coding are relatively large, there is substantial complexity in searching among multiple reference frames in order to find the best match for the current frame.

DESCRIPTION OF EXAMPLE EMBODIMENTS

Overview

Techniques are provided for reference frame management for screen content video coding using hash or checksum functions. A video data stream including a plurality of frames is received, each frame including a plurality of pixels that define content within the frame. Utilizing a hash or checksum function, a plurality of hash code values associated with partitioned portions of a current frame within the plurality of frames are determined, where each hash code value is determined as an output value from the hash or checksum function based upon an input value comprising pixel values for a corresponding partition within the current frame. The current frame is compared with a plurality of reference frames based upon a comparison of the hash code values of the current frame with hash code values of the reference frames, and a reference frame is selected as a candidate reference frame for coding the current frame based upon hash code values of the selected reference frame matching hash code values for the current frame. In one example, a single reference frame is selected as a candidate reference frame for coding the current frame. In another example, a plurality of reference frames are selected as candidate reference frames for coding partitioned portions of the current frame.

Example Embodiments

Screen encoding techniques are described herein for capturing desktop screen content, e.g., for sharing during a collaboration session between two or more computing devices. The screen encoding techniques described herein can utilize any suitable coding format, such as H.264 format. In particular, as described herein, reference frames are processed and managed herein utilizing a fast hash algorithm such as MD5 or any other suitable type of hash or checksum function. As described herein, reference frame management occurs at the frame level, where a series of reference frames are processed utilizing a hash function and stored for comparing with current frames.

Figure 1:
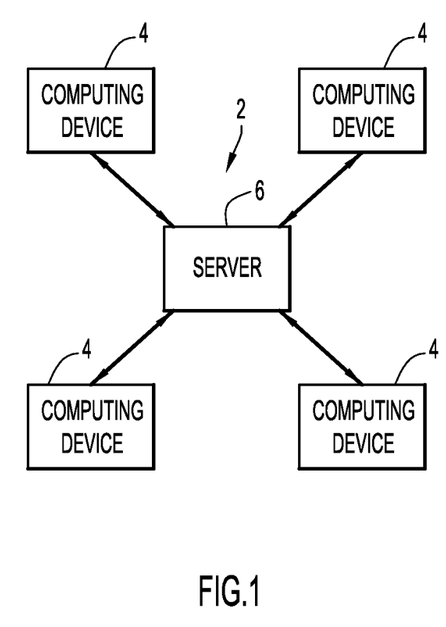
FIG. 1 is a schematic block diagram of an example system in which computing devices are connected to facilitate a collaboration session between the devices including desktop sharing from one device to one or more other devices.

An example system that facilitates collaboration sessions between two or more computing devices is depicted in the block diagram of FIG. 1. The collaborations session can include desktop sharing of digital content displayed by one computing device to other computing devices of the system. A collaboration session can be any suitable communication session (e.g., instant messaging, video conferencing, remote log-in and control of one computing device by another computing device, etc.) in which audio, video, document, screen image and/or any other type of digital content is shared between two or more computing devices. The shared digital content includes desktop sharing, in which a computing device shares its desktop content (e.g., open documents, video content, images and/or any other content that is currently displayed by the computing device sharing the content) with other computing devices in a real-time collaboration session. In other words, desktop sharing during a real-time collaboration session allows other computing devices to receive and display, at substantially the same time (or with a minimal or slight time delay), the same content that is being displayed at the computing device sharing such content. Thus, for example, in a scenario in which one computing device is switching between documents (e.g., switching from a text document to a picture or some other document), the switching between documents as well as the static view of a particular document displayed at any given time by the computing device that is sharing its desktop content will also be displayed by other computing devices that are receiving the shared desktop content during the collaboration session.

The system 2 includes a communication network that facilitates communication and exchange of data and other information between two or more computing devices 4 and a server device 6. The communication network can be any suitable network that facilitates transmission of audio, video and other content (e.g., in data streams) between two or more devices connected with the system network. Examples of types of networks that can be utilized include, without limitation, local or wide area networks, Internet Protocol (IP) networks such as intranet or internet networks, telephone networks (e.g., public switched telephone networks), wireless or mobile phone or cellular networks, and any suitable combinations thereof. While FIG. 1 depicts five computing devices 4 connected with a single server device 6, this is for example purposes only. Any suitable number of computing devices 4 and server devices 6 can be connected within the network of system 2 (e.g., two or more computing devices can communicate via a single server device or any two or more server devices). While the embodiment of FIG. 1 is described in the context of a client/server system, it is noted that content sharing and screen encoding utilizing the techniques described herein are not limited to client/server systems but instead are applicable to any content sharing that can occur between two computing devices (e.g., content sharing directly between two computing devices).

Figure 2:
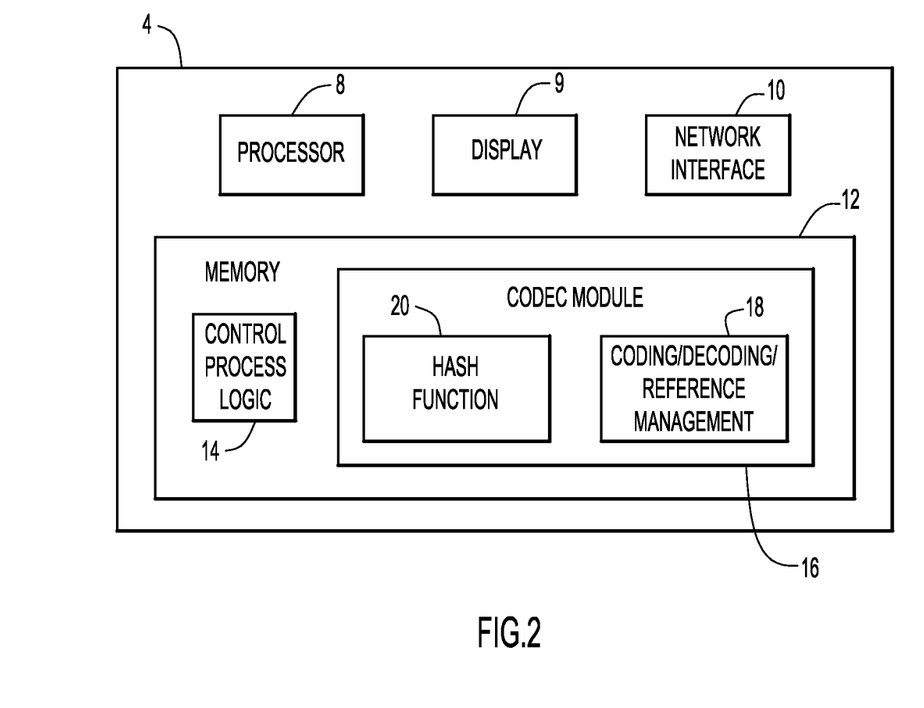
FIG. 2 is a schematic block diagram of an example computing device configured to engage in desktop sharing with other devices utilizing the system of FIG. 1.
Figure 3:
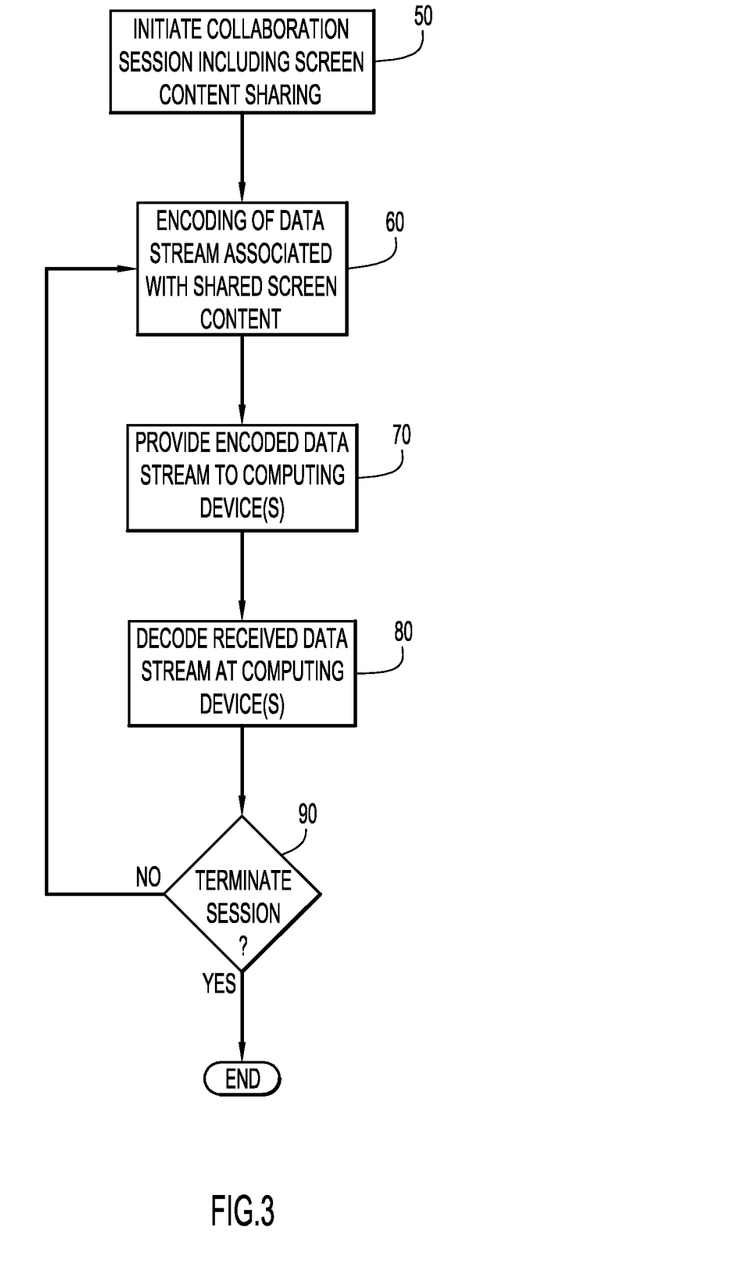
FIG. 3 is a flow chart that depicts an example process for performing a collaboration session between computing devices in accordance with embodiments described herein.

A block diagram is depicted in FIG. 2 of an example computing device 4. The device 4 includes a processor 8, a display 9, a network interface unit 10, and memory 12. The network interface unit 10 can be, for example, an Ethernet interface card or switch, a modem, a router or any other suitable hardware device that facilitates a wireless and/or hardwire connection with the system network, where the network interface unit can be integrated within the device or a peripheral that connects with the device. The processor 8 is a microprocessor or microcontroller that executes control process logic instructions 14 (e.g., operational instructions and/or downloadable or other software applications stored in memory 12). The display 9 is any suitable display device (e.g., LCD) associated with the computing device 4 to display video/image content, including desktop sharing content and other content associated with an ongoing collaboration session in which the computing device 4 is engaged.

The memory 12 can include random access memory (RAM) or a combination of RAM and read only memory (ROM), magnetic disk storage media devices, optical storage media devices, flash memory devices, electrical, optical, or other physical/tangible memory storage devices. The processor 8 executes the control process logic instructions 14 stored in memory 12 for controlling each device 4, including the performance of operations as set forth in the flowcharts of FIGS. 3-6. In general, the memory 12 may comprise one or more computer readable storage media (e.g., a memory device) encoded with software comprising computer executable instructions and when the software is executed (by the processor 8) it is operable to perform the operations described herein in connection with control process logic instructions 14. In addition, memory 12 includes an encoder/decoder or codec module 16 (e.g., including a hybrid video encoder) that is configured to encode or decode video and/or other data streams in relation to collaboration sessions including desktop sharing in relation to the operations as described herein. The encoding and decoding of video data streams, which includes compression of the data (such that the data can be stored and/or transmitted in smaller size data bit streams), can be in accordance with H.264 format or any other suitable format. The codec module 16 includes a coding/decoding/reference management module 18 that performs the coding and decoding functions related to a data bit stream including shared content or any other content that is subject to coding or decoding by the computing device, where module 18 further performs the functions of reference frame management utilizing hash functions as described herein. The codec module 16 further includes a hash function module 20 that calculates or determines hash codes for frames or portions of frames in accordance with a hash function or algorithm (e.g., utilizing an MD5 algorithm). While the codec module is generally depicted as being part of the memory of the computing device, it is noted that the codec module can be implemented in any other form within the computing device or, alternatively, as a separate component associated with the computing device. In addition, the codec module can be a single module or formed as a plurality of modules with any suitable number of applications that perform the functions of coding, decoding and reference management of content in the manner described herein.

Each server device 6 can include the same or similar components as the computing devices 4 that engage in collaboration sessions. In addition, each server device 6 includes one or more suitable software modules (e.g., stored in memory) that are configured to provide a platform for facilitating a connection and transfer of data between multiple computing devices during a collaboration or other type of communication session. Each server device can also include a codec module for encoding and/or decoding of a data stream including video data and/or other forms of data (e.g., desktop sharing content) being exchanged between two or more computing devices during a collaboration session.

Some examples of types of computing devices that can be used in system 2 include, without limitation, stationary (e.g., desktop) computers, personal mobile computer devices such as laptops, note pads, tablets, personal data assistant (PDA) devices, and other portable media player devices, and cell phones (e.g., smartphones). The computing and server devices can utilize any suitable operating systems (e.g., Android, Windows, Mac OS, Symbian OS, RIM Blackberry OS, Linux, etc.) to facilitate operation, use and interaction of the devices with each other over the system network.

System operation, in which a collaboration session including content sharing (e.g., desktop sharing) is established between two or more computing devices, is now described with reference to the flowcharts of FIGS. 3-6. At 50, a collaboration session is initiated between two or more computing devices 4 over the system network, where the collaboration session is facilitated by one or more server device(s) 6. During the collaboration session, a computing device 4 shares its screen or desktop content (e.g., some or all of the screen content that is displayed by the sharing computing device) with other computing devices 4, where the shared content is communicated from the sharing device 4 to other devices 4 via any server device 6 that facilitates the collaboration session. At 60, a data stream associated with the shared screen content is encoded utilizing hybrid video encoder techniques (e.g., in accordance with H.264 standards), in which predictive coding, transform coding and entropy coding are performed. In addition, reference management is performed as part of the coding process as described herein and depicted in FIGS. 4-6. The data stream to be encoded can be of any selected or predetermined length. For example, when processing a continuous data stream, the data stream can be partitioned into smaller sets or packets of data, with each packet including a selected number of frames that are encoded in accordance with the techniques described herein. The encoding of the data can be performed utilizing the codec module 16 of the desktop sharing computing device 4 and/or a codec module of one or more server devices 6.

At 70, the encoded data stream is provided, via the network, to the other computing devices 4 engaged in the collaboration session. Each computing device 4 that receives the encoded data stream utilizes its codec module 16, at 80, to decode the data stream for use by the device 4, including display of the shared screen content via the display 9. The decoding of a data stream also utilizes hybrid video encoder techniques (e.g., utilizing H.264 standards), in which inverse transform and entropy coding, reference management and compensation and reconstruction processing steps are utilized to decode the data stream. The reference management that is performed in the decoding of content also utilizes the techniques as described herein and depicted in the flowcharts of FIGS. 4-6. The encoding of a data stream (e.g., in sets or packets) for transmission by the sharing device 4 and decoding of such data stream by the receiving device(s) continues until termination of the collaboration session at 90 (or the desktop sharing portion of the collaboration session).

As previously noted, the encoding of data/content that is performed at 60 (as well as decoding of data at step 80) includes reference management on the individual frame level (i.e., on a frame-by-frame basis). In particular, a current frame that is to be processed and coded (or decoded) is first analyzed by comparing the current frame with reference frames to determine whether there is a suitable or sufficient match between the current frame (or one or more portions of the current frame) and a reference frame (or one or more portions of the reference frame). The reference frame management process utilizes one or more hash functions, stored within one or more applications 20 of the codec module 16, to calculate or determine hash codes for sections or pixel blocks within frames in order to facilitate a comparison between a current frame and one or more reference frames. Depending on the design of the system, the reference frame management as described herein and depicted in FIGS. 4-6 can be invoked in the following modes: Periodic, On Demand, At Pre-set Conditions or a combination of the above. In particular, the reference management process can be used periodically during the encoding process, by request, or based on pre-defined settings by users.

The reference management process can be critical in hybrid coding schemes, particularly schemes in which multiple reference frames for inter-frame prediction are supported. The reference management process described herein optimizes the reference selection process so as to improve compression efficiency of inter-frame prediction by maintaining suitable reference frames and determining when to add reference frames or modify the status of a frame (e.g., whether to designate a current frame as a reference frame and/or whether to remove an existing reference frame from a group of reference frames). The frame management process described herein is particularly useful for scenarios in which screen content is shared that may be static at times (e.g., the same or substantially similar screen content appears in a plurality of frames). This can occur, for example, when switching back and forth between windows of different applications or between two or more pages or slides of a document (e.g., between different slides of a PPT type document, or between different pages of a text document such as a TXT, DOC or other type of document). The reference management techniques described herein can efficiently encode repetitive types of content by finding proper or suitable references quickly and efficiently. In addition, the reference management techniques as set forth in FIGS. 4-6 can be separated or combined with other process steps during the coding/decoding of content to enhance computational efficiency and to simplify implementation.

Figure 4:
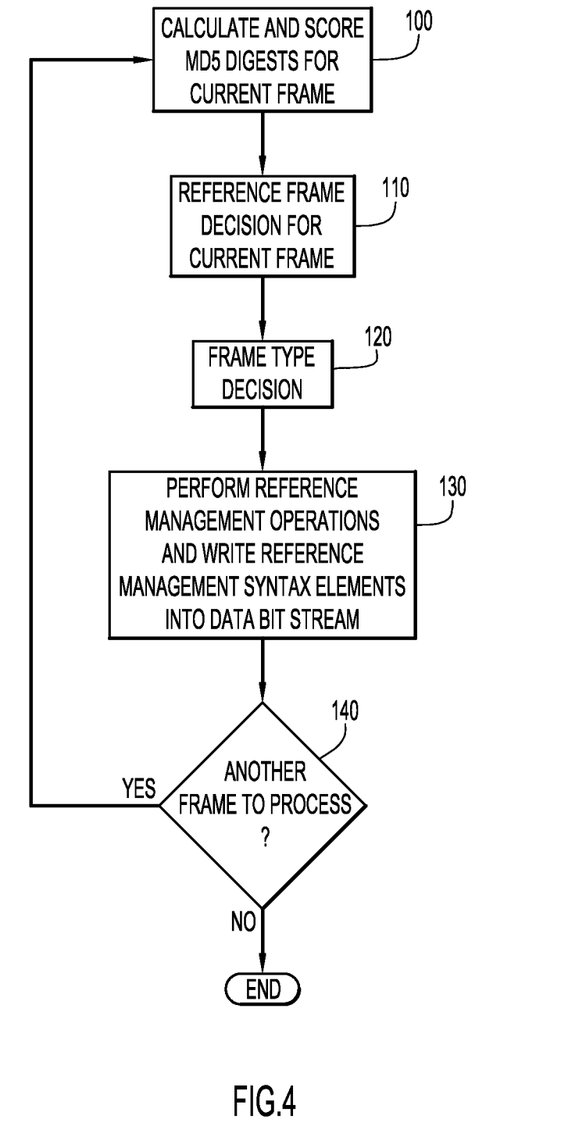
FIGS. 4-6 are flow charts depicting an example process for reference management utilized for the encoding process of FIG. 3.

Referring to FIG. 4, a current frame (e.g., the next frame to be processed during coding of a data stream) is analyzed at 100, using one or more hash functions (stored as hash function applications 20 within the code module 16), and its pixel values are used to calculate and store one or more digest values that represent the current frame. A particularly useful hash function is an MD5 algorithm. The MD5 algorithm is one in a series of message digest algorithms. It is a public hash algorithm that converts a variable-length message into a fixed-length output of 128 bits.

While the MD5 algorithm has been determined to be vulnerable in certain scenarios (e.g., it is possible for two different input messages to result in the same MD5 output value or hash code), this algorithm is particularly suitable for use in the reference management techniques described herein. Utilizing MD5-based multi-reference frame selection, a high compression ratio can be achieved with effective inter-frame prediction. Compared with traditional pixel-level multi-reference frame selection methods, the MD5 mapping method has an extremely low cache miss rate, which allows for an acceleration of the coding speed during the coding process. In addition, the MD5 calculation is intrinsically significantly faster than calculations for other hash functions, which is beneficial in real-time screen content sharing scenarios.

However, it is noted that, while the MD5 algorithm is described for use in reference management for the example embodiments, the reference management techniques are not limited to MD5 but instead can also be utilized with any other suitable one or more hash functions in which an input value (e.g., pixel values of a frame) are utilized as input for outputting hash code by the hash function(s).

The manner in which MD5 digest values for a frame (both current and reference frames) are calculated is as follows. The pixel value information of any frame can be considered as a message which is mapped to an MD5 hash code (or other hash code for another hash function) through a calculation utilizing the MD5 algorithm. The hash code that is returned for the MD5 calculation is referred to as an MD5 digest value. The pixel values of the entire frame can be utilized to determine a corresponding MD5 digest value. Alternatively, pixel value information can be obtained from one or more selected portions of the frame (e.g., a central portion, one or more corner or side portions, etc.), and these pixel values can be used to calculate corresponding MD5 digest values. Further still, a frame can be divided into multiple regions or pixel blocks of any suitable dimensions (e.g., a frame may be divided into 4 pixel blocks, 10 pixel blocks, 100 pixel blocks, etc.) that are used to calculate corresponding MD5 digest values in order to obtain a finer or more granular consideration of the frame during the reference frame processing.

After calculation and storing of one or more MD5 digest values for a current frame, the current frame is compared with reference frames (e.g., previous frames within the data stream that have been selected as reference frames). It is noted that the reference frames have already been processed so as to also have one or more corresponding MD5 digest values based upon pixel values of the entire frame or one or more portions of the frame (e.g., a series of defined pixel blocks within the frame) that correspond with the portions of the current frame that have been selected for mapping with MD5 digest values. The comparison includes a reference frame decision for the current frame at 110 (which is described in further detail herein with reference to FIG. 5) and also a frame type decision at 120 (which is described in further detail herein with reference to FIG. 6). These process steps determine which of the reference frames (could be one or more reference frames) provides the closest or best match with the current frame, based upon a comparison of their corresponding MD5 digest values, and also whether to modify a designation of the current frame and/or one or more reference frames as a reference type.

Figure 5:
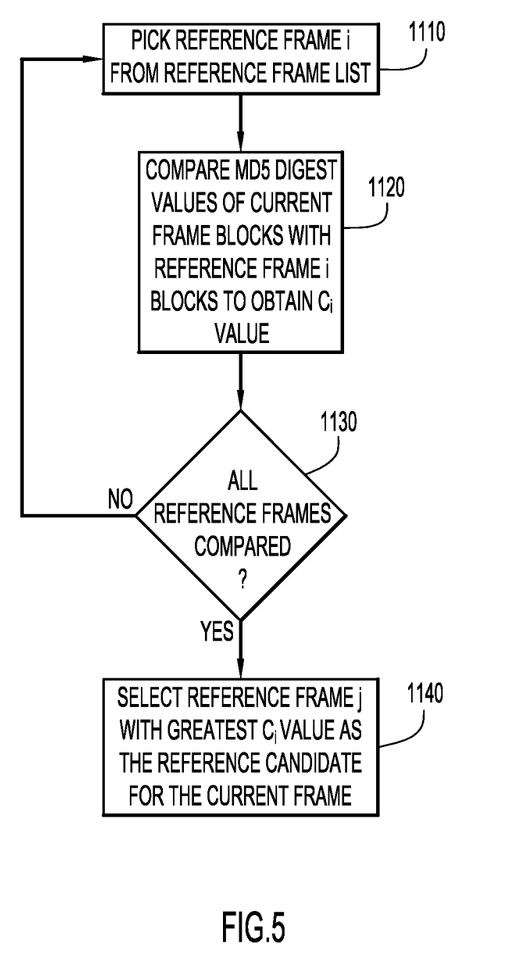

Referring to FIG. 5, a reference frame decision for the current frame (step 110 of FIG. 4) is determined by first selecting, at 1110, a reference frame i from a list of reference frames (e.g., the reference frame list may be stored within the codec module 16 and/or within any other location within memory 12), where each reference frame has already been processed and includes MD5 digest values mapped to predefined regions or pixel block locations within the frame. The selection of a first reference frame can be based upon any suitable criteria (e.g., start with the same reference frame that was determined as a match for one or more previous frames processed prior to the current frame, start with a reference frame that has been determined to have the most matches with other frames within a particular data bit stream or over a select time period, start with the first reference frame from a sequential order of reference frames that is prioritized upon historical age of the reference frames within the data bit stream, etc.).

At 1120, the MD5 digest values of the current frame are compared with the corresponding MD5 digest values for the reference frame i to obtain a consistent score value $c_i$. For example, in a scenario in which MD5 digest values are calculated based upon a series of predefined pixel blocks within a frame (where each pixel block has a predetermined dimension and a pixel value based upon the pixels within the pixel block, and the pixel value for the pixel block is utilized as the input message for calculating a corresponding MD5 digest output value utilizing the MD5 algorithm), the MD5 digest values mapped to pixel blocks of the current frame are compared with the MD5 digest values mapped to corresponding pixel blocks within the reference frame. The consistent score value $c_i$ can be determined in any suitable manner based upon the comparison of corresponding MD5 digest values within the current and reference frames. For example, the $c_i$ value can simply be a counter value for the number of pixel blocks within the current and reference frames that have matching MD5 digest values. A pair of hash code values, such as MD5 digest values, is considered to be matching when the values are the same or sufficiently similar (e.g., the two values are not identical but vary by a difference that falls within a predefined range so as to be considered essentially the same). In an example scenario, if there are 500 pixel blocks in both the current frame and a reference frame that correspond with each other and have the same (or sufficiently similar) MD5 digest values, the $c_i$ value can be set to 500 for this reference frame. The partitioning of the frames into pixel blocks (based upon a dimension setting for the pixel blocks and/or how much of the frame is to be analyzed) can be finer (i.e., a larger number of pixel blocks to be mapped with MD5 digest values) or coarser (e.g., a fewer number of pixel blocks to mapped with MD5 digest values) depending upon a particular scenario, where it is understood that the selection of number of frame partitions will impact performance and speed of the process.

At 1130, a determination regarding whether all reference frames have been compared with the current frame is made. If there are still reference frames within the list that need to be compared with the current frame, the process is repeated at 1110 so as to determine a $c_i$ value for each reference frame within the list in relation to the current frame.

The process of making a reference frame decision for a current frame is significantly different from traditional reference frame selection criteria, where pixel by pixel value differences are typically utilized to determine whether a reference frame is a suitable match for a current frame. With the embodiments described herein, in which a hash function such as MD5 is utilized to determine hash codes associated with frames, complexity in making a reference frame comparison with a current frame can be significantly reduced, where pixel-level subtraction and summation is avoided. For example, when using an MD5 algorithm as the hash function, only 128-bit values are used to calculate digest values corresponding with partitions/pixel blocks of frames.

Upon completion of the comparison of all reference frames with the current frame, a reference frame j is selected at 1140 that has the highest or greatest consistent score value $c_j$. This reference frame j is considered the reference frame candidate for further processing of the current frame.

While the process as depicted in the flow chart of FIG. 4 describes a determination of a single reference frame that provides the best frame candidate for the current frame based upon having the most consistency between frame partitions or pixel blocks between the frames (e.g., the best reference frame candidate has the greatest consistency in similarity between frame partitions/pixel blocks when comparing the current frame with each reference frame in the list of reference frames), it is noted that the process for finding best reference frame candidates can also be based upon a frame partition/pixel block basis. For example, an MD5 value corresponding with a single defined partition or pixel block of the current frame can be compared with MD5 values for frame partitions/pixel blocks in each of the reference frames from the list, where a greatest consistent score value can be assigned to a reference frame having at least one frame partition/pixel block that provides the closest or best match with the MD5 value corresponding with the frame partition or pixel block that is being evaluated for the current frame. Thus, a plurality of (i.e., two or more) reference frames may be selected for further processing of the current frame, where each frame partition/pixel block of the current frame is associated with a frame partition/pixel block of a single corresponding reference frame having the greatest consistent score value (as determined by comparison of each frame partition/pixel block of each reference frame with each frame partition/pixel block of the current frame and finding a best or closest match based upon the MD5 values associated with such frame partitions/pixel blocks).

Figure 7:
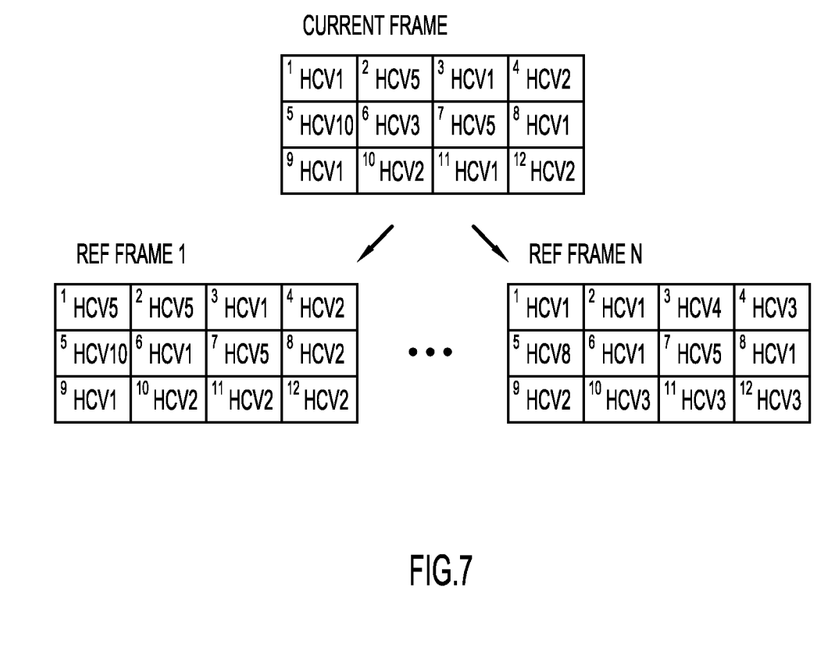
FIG. 7 is an example embodiment showing a comparison of hash codes associated with a current frame that are compared with hash codes associated with different reference frames.

An example embodiment showing a comparison of hash codes corresponding with partitions/pixel blocks of a current frame and partitions/pixel blocks of reference frames is schematically depicted in FIG. 7. This embodiment has been simplified to illustrate how hash code values can be compared for frame partitions/pixel blocks of the current frame and reference frames. For example, each frame is partitioned into 12 pixel blocks. However, it is noted that the frames can be partitioned in any suitable manner (e.g., into hundreds or thousands of defined pixel blocks, depending upon the desired granularity in consistency associated with finding one or more suitable reference frame candidates). Further, the hash code values are simplified as HCV# (e.g., HCV1, HCV2, HCV3, etc.) for each pixel block location, where the same HCV# value corresponds with a specific hash code value (e.g., a 128 bit MD5 digest value).

In comparing the current frame with reference frame 1 and reference frame N, reference frame 1 would have a greater consistent score value $c_i$ in relation to reference frame N when utilizing the process described herein in relation to the flow chart of FIG. 4. This is because reference frame 1 has more hash code values that are the same or similar in corresponding pixel blocks with the current frame in comparison to reference frame N (i.e., reference frame 1 has 8 pixel blocks with the same hash code values as corresponding pixel blocks for the current frame, while reference frame N has only 3 pixel blocks with the same hash code values as corresponding pixel blocks for the current frame).

However, when utilizing a process in which each pixel block of the current frame is compared with pixel blocks of the reference frames to find a best reference frame candidate for each pixel block, different reference frames may be considered as best candidates for different pixel blocks of the current frame. For example, when considering pixel block 1 of the current frame (having HCV1), reference frame N (also having HCV1 at pixel block 1) would be considered a better candidate reference frame for this pixel block in relation to reference frame 1 (which has HCV5 at pixel block 1). When considering pixel block 2 of the current frame (having HCV5), reference frame 1 (also having HCV5 at pixel block 2) would be considered a better candidate reference frame for this pixel block in relation to reference frame N (which has HCV1 at pixel block 2).

Figure 6:
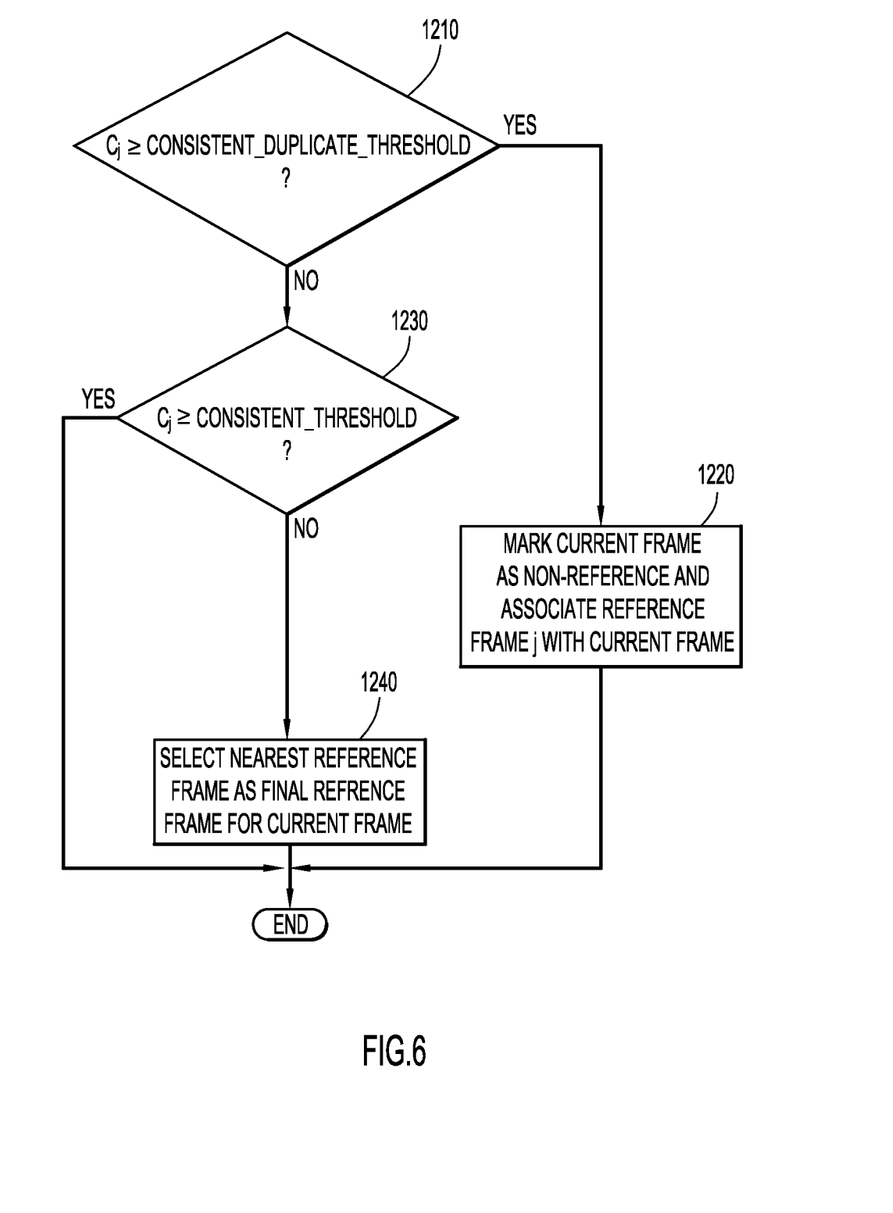

Performance of frame type decision at 120 in FIG. 4 is now described in greater detail with reference to the flowchart of FIG. 6. It is noted that the process of FIG. 6 corresponds with the process of FIG. 5, in which a single reference frame is determined as being a best candidate for the current frame. Initially, it is noted that, when a $c_i$ value is the same or greater than a predetermined threshold value according to the following condition: $c_i \geq$ Consistent_duplicate_threshold, this provides an indication that the current frame is a duplicate of the reference frame. The Consistent_duplicate_threshold value can be set as a constant value based upon a predetermined indication that a sufficient number of partitions or pixel blocks within two frames match (based upon their MD5 or other hash code values matching).

If the following condition is met: Change_threshold$\leq c_i <$Consistent_duplicate_threshold, the current frame is considered to be similar with but also having some changes or differences in relation to reference frame i. The Change_threshold value can also be set as a constant value based upon a predetermined indication that there are some slight changes or differences between two frames (i.e., Change_threshold<Consistent_duplicate_threshold). If a current frame is significantly different from a reference frame, the $c_i$ value associated with this reference frame will be so small such that: $c_i <$Change_threshold. In this scenario, the current frame is considered to be so different from the reference frame that it is not considered a match.

The highest consistent score value $c_j$ that is obtained from the reference frame decision process of FIG. 5 is compared with the Consistent_duplicate_threshold value at 1210. If the $c_j$ value is the same or greater than the Consistent_duplicate_threshold value, the current frame is determined to be a match with the reference frame j. In this case, the current frame will be marked or considered as a non-reference frame at 1220. In addition, the reference frame j is associated with the current frame such that the previous coding performed for the reference frame can be applied for the current frame.

In the event the $c_j$ value is less than the Consistent_duplicate_threshold value, the $c_j$ value is next compared with the Change_threshold value at 1230. If the $c_j$ value is less than the Change_threshold value, the $c_i$ values of all reference frames from the list are very small and this indicates that there are significant or large scale content changes within the current frame in relation to the reference frames in the list. In this case, a reference frame that is nearest the current frame (i.e., closest to the current frame in the sequential order of frames within the data bit stream of content) may be selected at 1240 as the final reference frame to be used for coding the current frame. If the $c_j$ value is the same or greater than the Change_threshold value, the current frame is considered to have normal or slight changes. In this case, the reference frame j associated with the $c_j$ value is still considered the candidate reference frame for the current frame.

Referring again to FIG. 4, after a reference frame decision for a current frame and frame type decision have been performed, reference management operations are performed by the Codec module 12 at 130. The reference management operations include associating the best or closest matching reference frame, if one has been found (e.g., utilizing the procedures as described herein and depicted in FIGS. 5 and 6), with the current frame to facilitate efficient coding of content within the data bit stream being processed. In addition, suitable reference management syntax elements are provided within the data bit stream to render the decoding of content more efficient (based upon the same association of the reference frame with the current frame) by the Codec module 12 of another computing device 4 that receives and processes content within the data bit stream.

At 140, it is determined whether another frame (i.e., a frame subsequent to the current frame) needs to be processed for reference frame management. If one or more additional frames from the data bit stream still need to be processed, the process returns to step 100, with the next subsequent frame being designated as the current frame. Otherwise, the reference frame management process ends.

Thus, the embodiments described herein provide for efficient encoding and inter-frame prediction of content by finding at least one suitable reference frame for a current frame being analyzed and in which one or more suitable hash functions can be applied to facilitate an easy comparison of a current frame with possible reference frame candidates in order to obtain a suitable match. This is particularly effective for screen content sharing, in which there is a high probability that similar or the same content will appear repeatedly from time to time (e.g., moving forward and then backward in a PowerPoint presentation, dialog switching, etc. within a collaboration session in which content is being shared from one computing device to one or more other computing devices).

Utilizing the techniques described herein, bit consumption during encoding can be greatly reduced since inter-frame prediction is of high compression efficiency for screen content video. In addition, utilizing an MD5 algorithm to obtain MD5 digest values for partitions/pixel blocks of frames for access during reference frame management rather than traditional pixel-level access in multiple frames, the cache miss rate can be decreased. Moreover, the MD5 digest based calculation is faster than pixel-level calculation from frame to frame in typical calculations such as Sum-of-Absolute-Difference (SAD) and Sum-of-Square-Difference (SSD).

The techniques described herein are useful for any application that uses coding tools with multiple reference frames. For example, applications which use a hybrid video coding scheme such as H.264 can utilize the techniques described herein. As previously noted, applications like real-time screen content sharing with video coding technology can also utilize the techniques described herein (e.g., collaboration sessions that are conducted between computing devices within systems such as described herein and depicted in FIGS. 1 and 2). When combined with other proper methods, these techniques can also be beneficial for information retrieval or random accessing of screen video applications. The techniques described herein are further not limited to screen content video coding, but can also be applied for use in camera video coding or any other coding of content.

The above description is intended by way of example only.

What is claimed is:

1. A method comprising:
   providing a video data stream including a plurality of frames, each frame including a plurality of pixels that define content within the frame;
   utilizing a hash or checksum function, determining a plurality of hash code values associated with partitioned portions of a current frame within the plurality of frames, wherein each hash code value is determined as an output value from the hash or checksum function based upon an input value comprising one or more pixel values for a corresponding partition within the current frame;
   comparing the hash code value of each partitioned portion of the plurality of partitioned portions of the current frame with the hash code value of a corresponding partitioned portion of each reference frame; and
   selecting a plurality of reference frames as candidate reference frames for coding the current frame based upon hash code values of the selected reference frames that are closest matches to hash code values for the current frame, wherein the selecting a plurality of reference frames comprises:
      selecting a reference frame having a hash code value at the corresponding partitioned portion of the reference frame that is a closest match to the hash code value of the partitioned portion of the current frame as the candidate reference frame for the partitioned portion of the current frame.

2. The method of claim 1, wherein the utilizing a hash or checksum function comprises utilizing a MD5 hash code function that outputs MD5 digest values corresponding with partitioned portions of the current frame.

3. The method of claim 1, further comprising:
   establishing a collaboration session between a first computing device and a second computing device, wherein the first computing device shares the screen content including the video data stream with the second computing device.

4. An apparatus comprising:
   a memory configured to store instructions including one or more reference management and hash function applications; and
   a processor configured to execute and control operations of the one or more reference management and hash function applications so as to:
      provide a video data stream including a plurality of frames, each frame including a plurality of pixels that define content within the frame;
      utilize a hash or checksum function to determine a plurality of hash code values associated with partitioned portions of a current frame within the plurality of frames, wherein each hash code value is determined as an output value from the hash or checksum function based upon an input value comprising one or more pixel values for a corresponding partition within the current frame;
      compare the hash code value of each partitioned portion of the plurality of partitioned portions of the current frame with the hash code value of a corresponding partitioned portion of each reference frame; and
      select a plurality of reference frames as candidate reference frames for coding the current frame based upon hash code values of the selected reference frames that are closest matches to hash code values for the current frame, wherein the selecting a plurality of reference frames comprises:
         selecting a reference frame having a hash code value at the corresponding partitioned portion of the reference frame that is a closest match to the hash code value of the partitioned portion of the current frame as the candidate reference frame for the partitioned portion of the current frame.

5. The apparatus of claim 4, further comprising an interface unit configured to establish a collaboration session between the apparatus and a computing device, wherein the apparatus shares screen content including the video data stream with the computing device.

6. The apparatus of claim 4, wherein the processor is further configured to utilize an MD5 hash code function that outputs MD5 digest values corresponding with partitioned portions of the current frame.

7. One or more computer readable storage devices encoded with software comprising computer executable instructions and when the software is executed operable to:
   provide a video data stream including a plurality of frames, each frame including a plurality of pixels that define content within the frame;
   utilize a hash or checksum function to determine a plurality of hash code values associated with partitioned portions of a current frame within the plurality of frames, wherein each hash code value is determined as an output value from the hash or checksum function based upon an input value comprising one or more pixel values for a corresponding partition within the current frame;
   compare the hash code value of each partitioned portion of the plurality of partitioned portions of the current frame with the hash code value of a corresponding partitioned portion of each reference frame; and
   select a plurality of reference frames as candidate reference frames for coding the current frame based upon hash code values of the selected reference frames that are closest matches to hash code values for the current frame, wherein the selecting a plurality of reference frames comprises:
      selecting a reference frame having a hash code value at the corresponding partitioned portion of the reference frame that is a closest match to the hash code value of the partitioned portion of the current frame as the candidate reference frame for the partitioned portion of the current frame.

8. The one or more computer readable storage devices of claim of claim 7, and further comprising instructions that are operable to:
   utilize a MD5 hash code function that outputs MD5 digest values corresponding with partitioned portions of the current frame.

9. The one or more computer readable storage devices of claim of claim 7, and further comprising instructions that are operable to:

establish a collaboration session between a first computing device and a second computing device, wherein the first computing device shares the screen content including the video data stream with the second computing device.

* * * * *